(No Model.) 5 Sheets—Sheet 2.
F. L. & L. H. DYER.
ELECTRICAL STEERING GEAR.
No. 550,018. Patented Nov. 19, 1895.
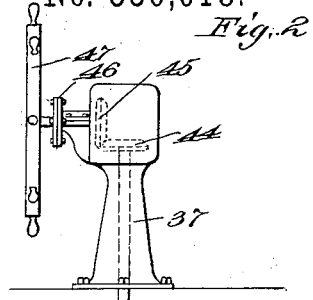
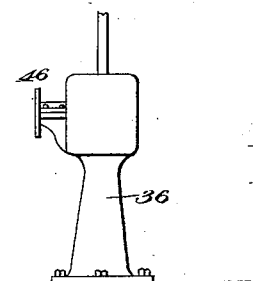
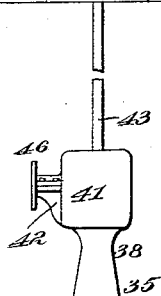
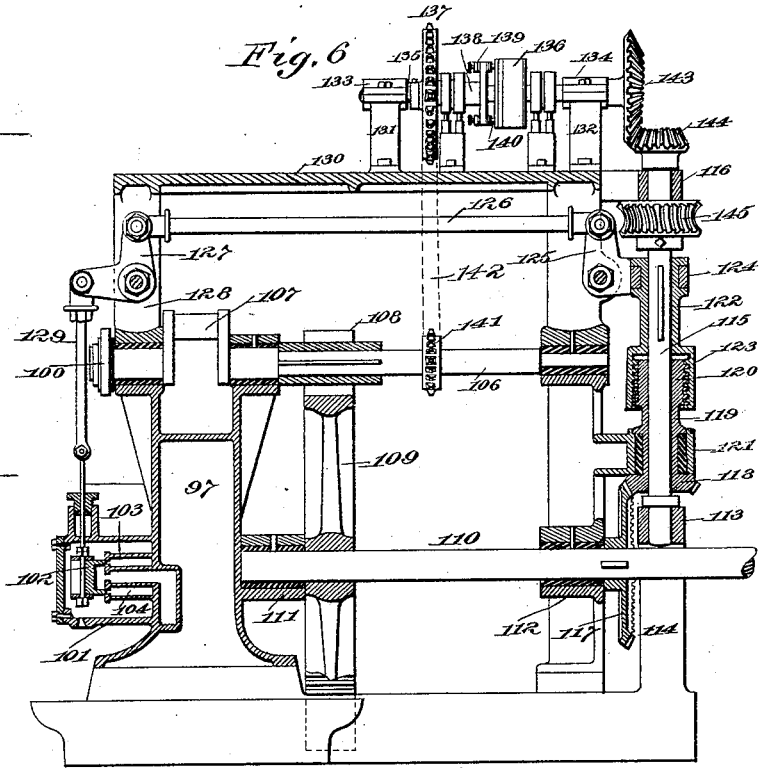
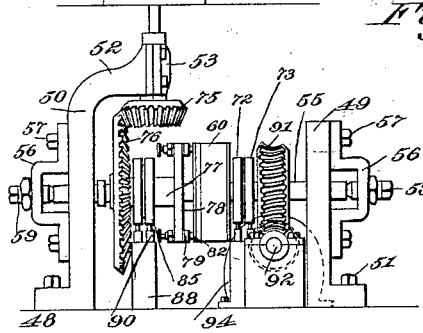
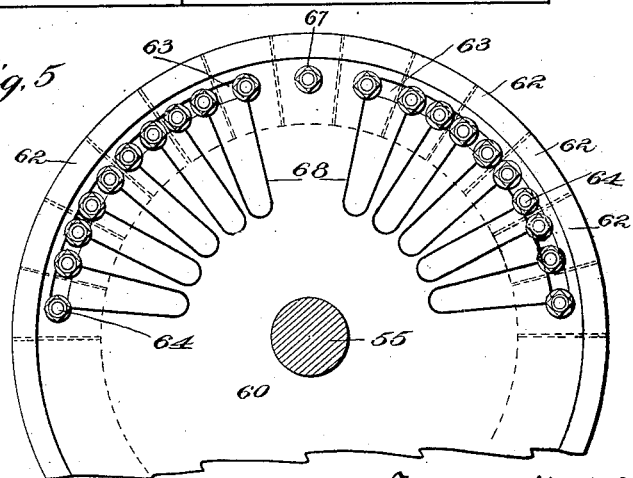
Witnesses
Inventors
Frank L. Dyer, and
Leonard H. Dyer
by Frank L. Dyer
their Attorney
ANDREW B.GRAHAM, PHOTO-LITHO. WASHINGTON, D.C.

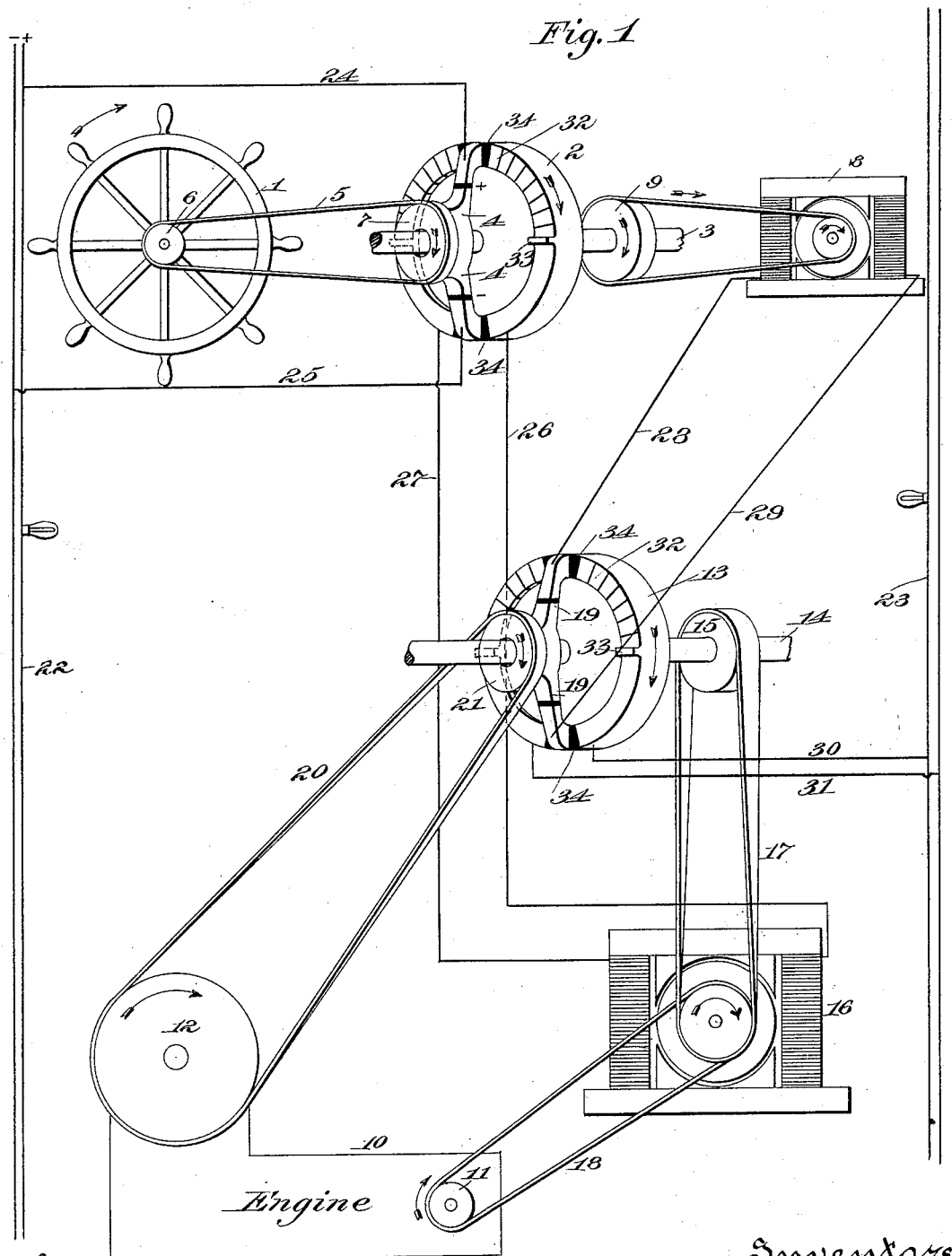

(No Model.) 5 Sheets—Sheet 3.
F. L. & L. H. DYER.
ELECTRICAL STEERING GEAR.
No. 550,018. Patented Nov. 19, 1895.

Witnesses
Inventors
Frank L. Dyer and
Leonard H. Dyer
by Frank L. Dyer
their Attorney

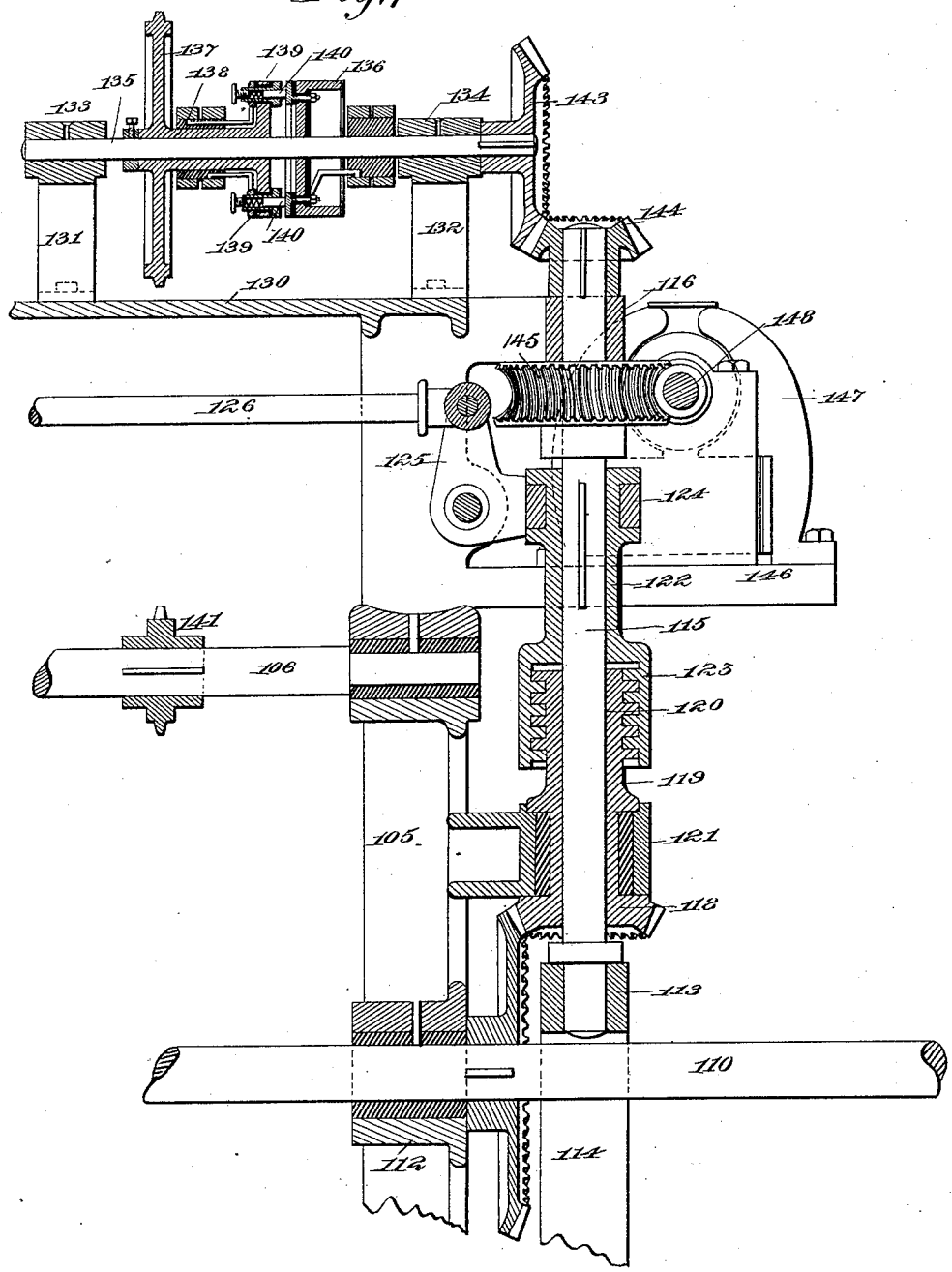

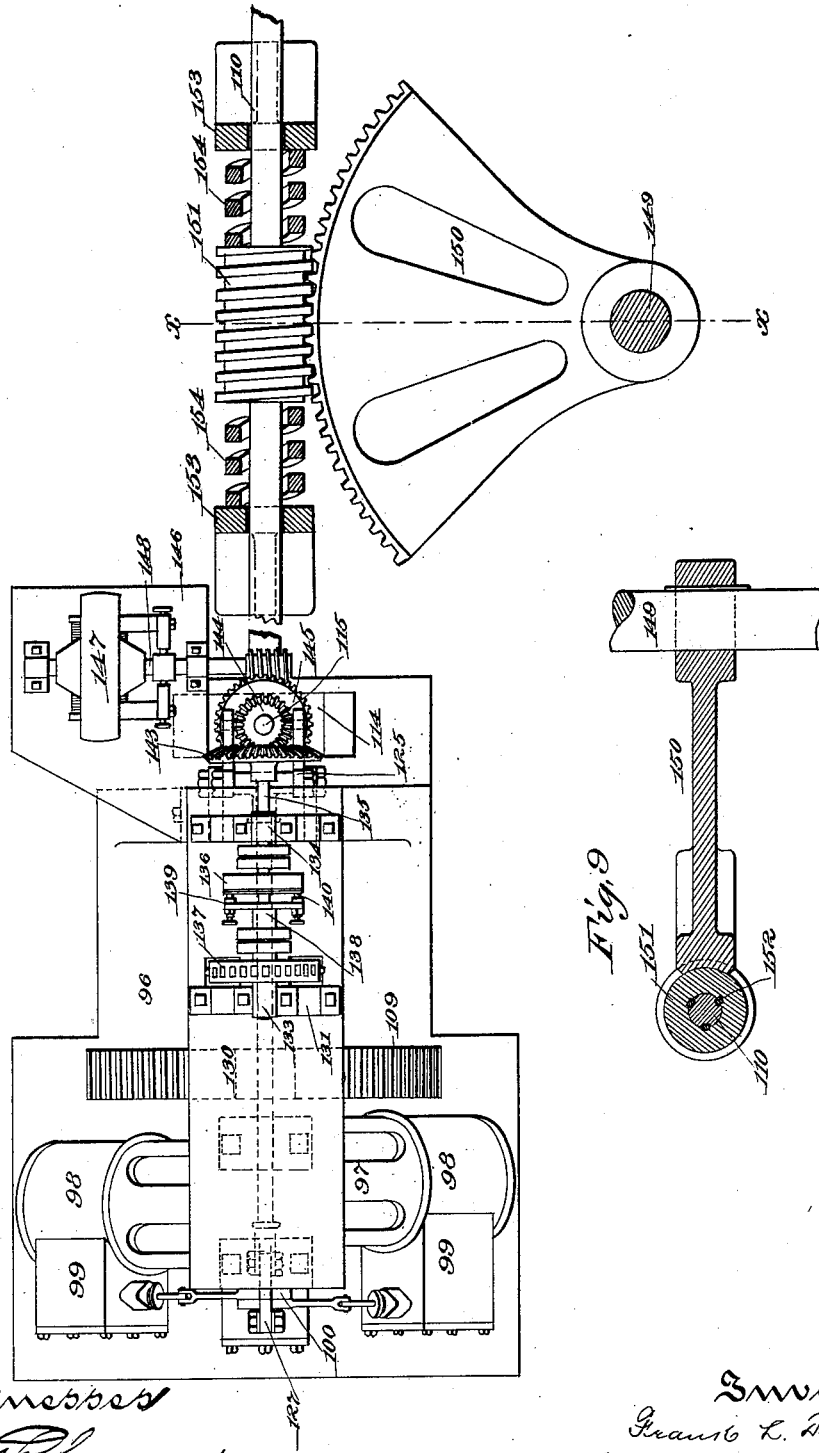

UNITED STATES PATENT OFFICE.

FRANK L. DYER AND LEONARD H. DYER, OF WASHINGTON, DISTRICT OF COLUMBIA.

ELECTRICAL STEERING-GEAR.

SPECIFICATION forming part of Letters Patent No. 550,018, dated November 19, 1895.

Application filed October 4, 1894. Serial No. 524,861. (No model.)

*To all whom it may concern:*

Be it known that we, FRANK L. DYER and LEONARD H. DYER, citizens of the United States, residing at Washington, in the District of Columbia, have invented certain new and useful Improvements in Methods of and Means for Controlling Electric Motors for Use with Electric Steering-Gears and for other Purposes; and we do hereby declare the following to be a full, clear, and exact description of the invention, which will enable others skilled in the art to which it appertains to make and use the same.

Our invention relates to a method of and means for controlling electric motors and to the adaptation of such method and means in connection with an improved type of electric steering-gear.

By the improved method of and means for controlling electric motors which form a part of our invention we are enabled to govern the direction and speed of rotation and the extent of movement of an electric motor so as to render the same particularly applicable for controlling the valves of steam steering-engines, as explained in our joint patent, No. 498,160, dated May 23, 1893, and patent, No. 515,286, dated February 20, 1894, to Frank L. Dyer.

An electric motor controlled in the improved manner to be presently described is capable of many other uses, such as for governing the valves of marine and large stationary engines, for operating electrical hoists, &c.

We will also describe and claim herein certain improvements in electric steering-gears, in which we make use of an electric motor controlled in the manner referred to.

For a better comprehension of the invention attention is directed to the accompanying drawings, forming a part of this specification, and in which—

Figure 3:
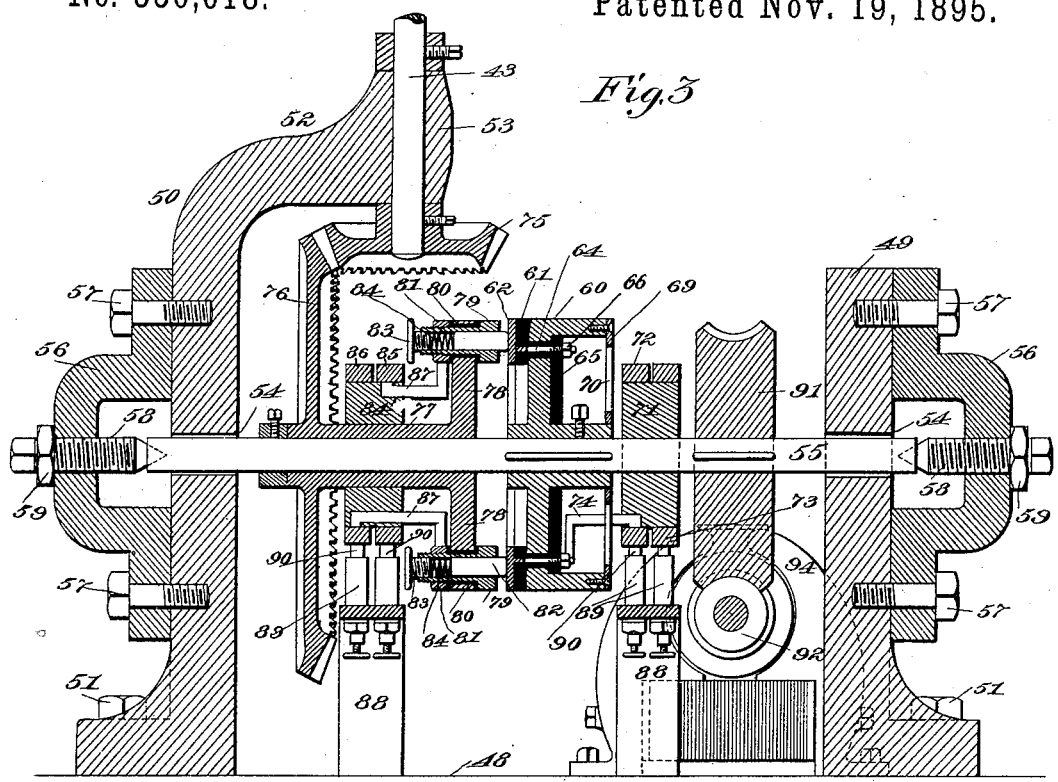
Figure 4:
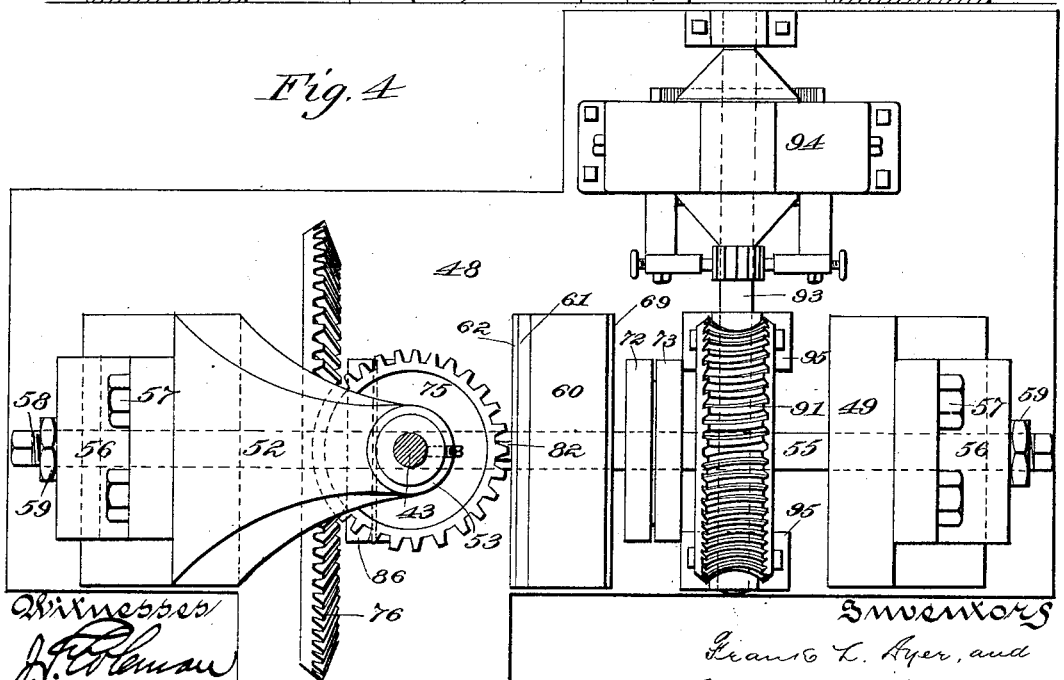

Figure 1 is a diagrammatic view illustrating the method of and means for controlling an electric motor and showing the same applied to a steam-engine for governing the valves thereof. Fig. 2 is a side elevation of the circuit-controller at the bow of a boat. Fig. 3 is an enlarged sectional view of the circuit-controller at the bow of a boat, except that the connections with the steering wheel or wheels are not shown. Fig. 4 is a plan view of Fig. 3. Fig. 5 is an interior view of one of the reversing-switches. Fig. 6 is a sectional view of a steering-engine embodying our present improvements. Fig. 7 is an enlarged sectional view of a portion of said steam steering-engine, illustrating the connections of a controlled electric motor thereto for governing the valves thereof. Fig. 8 is an enlarged plan view of Fig. 6, showing the connections with the rudder-stock; and Fig. 9 is a cross-sectional view on the line X X of Fig. 8.

In all the above views corresponding parts are designated by the same characters of reference.

Referring to Fig. 1, 1 represents a steering-wheel.

2 is a reversing-switch rigidly mounted on a shaft 3, said reversing-switch being provided with resistances therein. 4 4 are the contact-arms of said switch carried by a sleeve, which is mounted on said shaft 3 and adapted to be revolved thereon by means of the belt 5, engaging with the pulleys 6 and 7. Said contact-arms are insulated from each other, as shown.

8 is a small electric motor of any desired type, operating the pulley 9, which is rigidly mounted on the shaft 3.

The elements just described are to be placed, preferably, at some convenient point, preferably at or near the bow of the boat, the steering-wheel 1 being mounted within the wheel-house, conning-tower, or on the bridge, as heretofore.

10 is a steam-engine or other prime motor having a valve 11, by means of which the direction and extent of movement of the engine will be controlled. Most, if not all, of the steam steering-engines now in use are provided with a similar valve or valves for controlling the same, as explained. 12 is a band-wheel operated by said engine 10.

13 is a reversing-switch corresponding to the switch 2. The switch 13 is rigidly mounted on a shaft 14, which carries a band-wheel 15, adapted to be operated by an electric motor 16 by means of the belt 17. Said electric motor also operates the valve 11 of the engine by means of the belt 18 in such a way that as the electric motor revolves in one direction or the other to any given extent the engine will be caused to operate in the same direction and to a corresponding extent.

19 19 are the contact-arms of the switch 13, which contact-arms are operated from the band-wheel 12 by means of the belt 20 engaging with the band-wheel 21. Said contact-arms may, however, be operated in any way desired by any element operated either directly or indirectly by the engine.

At the extreme sides of Fig. 1 we illustrate, diagrammatically, two electric circuits 22 23, from which the incandescent and other lights on the vessel may be supplied. The contact-arms 4 4 of the switch 2 are connected in multiple arc with the circuit 22 by the wires 24 25. The two sections of the switch 2 are connected with the motor 16 by the wires 26 and 27. The contact-arms 19 19 of the switch 13 are connected with the motor 8 by the wires 28 and 29. The two sections of the switch 13 are connected in multiple arc with the circuit 23 by the wires 30 and 31.

In the apparatus embodying the elements described we control the electric motor 16, which is of sufficient power to operate the valve 11 or to do any other necessary work, as follows: The steering-wheel 1, it will be supposed, is rotated to the right in the direction of the arrow. This will cause the contact-arms 4 4 to be moved over the face of the switch 2, and the circuit from the mains constituting the circuit 22 will be established through the wire 24, contact-arm 4, one section of the switch 2, wire 26, motor 16, wire 27, the other section of the switch 2, the other contact-arm 4, and wire 25. The motor 16, therefore, will start to revolve in the proper direction, which we will suppose is to the right, as represented by the arrow. The motor 16 in operating will turn the valve 11 so that the engine 10 will operate in the same direction and at a speed which will depend upon the speed of the motor 16. The engine 10 in operating will cause the band-wheel 12 to be moved in the same direction and at the same speed, which band-wheel will tend to revolve the contact-arms 19 19 of the switch 13 in the direction of the arrow. The circuit from the mains constituting the circuit 23 will therefore be established through the wire 30, one section of the switch 13, one contact-arm 19, wire 28, motor 8, wire 29, other contact-arm 19, other section of the switch 13, and wire 31. The motor 8 will therefore be revolved in the same direction as represented by the arrow and said motor, by reason of its connection with the band-wheel 9, will revolve the switch in the same direction as the contact-arms 4 are moving on the face of the switch. At the same time the motor 16 is operating, the switch 13 will be revolved by said motor through the medium of the belt 17 and band-wheel 15 in the same direction as the contact-arms 19 19 are moving on the said switch.

A consideration of the movements just described will demonstrate, first, that the motor 16 will be moved in the same direction as the wheel 1, which is operated by hand; second, that the motor 16 will rotate at a speed depending upon the speed of the wheel 1, and, third, that the extent of movement of the motor 16 will depend upon the extent of movement of the wheel 1. That the motor 16 revolves in the same direction as the wheel 1 will be evident immediately upon inspection and depends only upon the proper arrangement of the circuits. That the said motor revolves with the same relative speed as the wheel 1 depends largely upon the fact that the switches 2 and 13 are provided with resistances therein. In other words, the said switches not only are arranged to properly direct the current through the motors 16 and 8, respectively, but by being provided with the series of segments 32, connected by resistances in the usual way, the supply of current to said motors will be increased when the contact-arms 4 and 19 approach the stops 33 and will be decreased when said arms are brought back to the dead-points 34. Should the motor 16 revolve at a greater rate of speed than corresponds to the speed of the wheel 1, it will be evident that the switch 13 will be moved to a greater extent with respect to the contact-arms 19 19 than if the motor 16 started more slowly, so that a greater amount of current will pass from the circuit 23, through the switch 13, to the motor 8 than would otherwise be the case or, in other words, the amount of current supplied to the motor 8 depends directly on the speed of the motor 16. This current will therefore operate the motor 8 with a speed depending on the speed of the motor 16, and the increase of speed of the motor 8 will tend to move the switch 2 more rapidly in the same direction that the contact-arms 4 4 are moving, so as to cut in a larger number of the segments 32, or, in some instances, in the case of sudden fluctuations, to bring the dead-points 34 34 in contact with said contact-arms 4. Should such dead-points 34 34 be brought in contact with the contact-arms 4, then of course no current will pass to the motor 16 and its speed will be slackened, and so, also, is the case when a large number of segments 32 32 are cut into the circuit of said motor. As soon as the motor 16 is influenced by these conditions and its speed decreases, then the relative relations between the elements of the switch 13 will be affected and the speed of the motor 8 will be retarded somewhat, so that a greater amount of current will be allowed to pass to the motor 16, whereupon its speed will tend to increase. The speed of the motor 16 therefore depends on that of the wheel 1, and by properly adjusting the parts and the relative movements of the elements the velocity of the motor 16 can be so regulated as to operate the valve of the steering-engine at the usual and proper speed for the steering of the vessel.

It has been mentioned that the extent of movement of the motor 16 depends upon the extent of movement of the wheel 1, and this feature of the invention will be briefly explained.

It being a fact, as stated and as will be understood, that the speed of the motor 16 depends upon that of the wheel 1, then of course if the motor 16 begins to rotate when the wheel 1 starts, and if these two elements stop simultaneously, then of course the extent of movement of one will correspond to the extent of movement of the other; or, to speak more correctly, if the motor 16 starts to operate in a fraction of time after the wheel 1 starts and stops in the same fraction of time after the wheel 1 stops, then the same is true.

The movement of the steering-wheel 1 in one direction or the other, as before explained, causes the switch-arms 4 4 and 19 19, switches 2 and 13, and motors 8 and 16 to turn in the same direction. In practice it is desirable to so adjust the parts that the movement of the steering-engine tends to operate the switch-arms 19 more rapidly than the motor 8 tends to operate the switch-arms 4; or, in other words, the parts being in operation, it will be apparent that as the switch-arms 4 4 are turned around the face of the switch 2 in one direction and that the switch follows the movements of said switch-arms at a distance behind them corresponding to the speed of the steering-wheel 1, the distance becomes greater as the speed of the said steering-wheel is increased. It will be also observed that at the stern the switch 13 is being rotated by the motor 16 and that the switch-arms 19 19 are following the movements of said switches.

When the movement in one direction or the other of the steering-wheel 1 is arrested, the switch-arms 4 4 will be stopped in their movements with respect to the switch 2. The circuits 24, 25, 26, and 27 will continue to be charged, however, and the motor 16 will remain in operation, and since the motor 16 revolves the motor 8 will also operate. The motor 8, therefore, in operating tends to turn the switches 2 around until the dead-points 34 34 are in contact with the switch-arms 4 4, and when this is done no current is supplied to the motor 16 and the movement of said motor is therefore arrested, there being always a slight loss of motion between the valve 11 of the steering engine and the band-wheel 12, as we shall presently explain. When the motor 16 stops the engine 10 in taking up this lost motion will carry the contact-arms 19 19 in contact with the dead-points 34 34, and the circuit to the motor 8 will be broken, and therefore both motors 8 and 16 will stop. These movements of course take place practically simultaneously with the stopping of the steering-wheel 1, and an inspection of all the parts will show that the starting of these motors is also practically simultaneous with that of the steering-wheel 1, so that the statement that the extent of movement of the motors 16 corresponds to that of the steering-wheel 1 is approximately true.

It will of course be understood in connection with the diagrammatic representation of the parts illustrated in Fig. 1 that no attempt is made to illustrate a device which could be set up and practically used, since the various belts shown for establishing communications would undoubtedly be insufficient. Such a representation, however, clearly shows the general ideas which we have in mind and which are carried out in practical form in other figures of the drawings.

It will be understood that the wires 24 25 can be connected with the two segments of the switch 2, and that the wires 26 and 27 can be connected with the two contact-arms 4 4, and that the same transposition may be made at the stern of the vessel without affecting the operation of the device in any way.

It is to be further understood that the motor 16, which is controlled by hand, as explained, can be used for operating the valves of marine and large stationary engines, for operating electrical elevators and hoists, and for other purposes.

In the other figures of the drawings we have shown the adaptation of the method and the means for controlling electric motors above described to an electric steering-gear, which possesses several features of novelty.

Near the bow of the boat, in the case of a man-of-war, for example, we mount the casing 35 within the conning-tower, the casing 36 directly above the same in the chart-house, and the casing 37 on the bridge. The general construction of these casings will be understood from the drawings, each consisting of a hollow standard 38, having a flange 39 at the bottom, provided with bolts 40 for holding the casing firmly in place. At the top of the hollow standard 38 is a chamber 41, having a bracket 42 at the side thereof, a shaft 43 extending from the casing 37, as shown in dotted lines, Fig. 2, to a point within the hold of the vessel, where the circuit-controllers are located. This shaft 43 is provided within the chamber 41 with a beveled gear 44, with which a vertical beveled gear 45 engages. The gear 45 is mounted on a horizontal shaft, to which is secured a flange 46, a steering-wheel 47 of ordinary construction being bolted to the flange 46. Any other construction for accomplishing the desired end can be made use of, as will be understood.

The construction of the circuit-controller at the bow is shown in detail in Figs. 3 and 4, to which attention is now directed.

48 is a heavy metallic base. 49 and 50 are standards secured to said base by bolts 51. The standard 50 is provided with the supporting-arm 52, having the bearings 53 therein, which supports the shaft 43. The standards 49 and 50 are provided with a passage 54 therein, within which is mounted the horizontal shaft 55.

56 is a bracket secured by bolts 57 to the outside of the standards 49 and 50.

58 58 are heavy screw-bolts provided with coned ends which pass through the brackets 56, as shown, and which engage with cone-shaped recesses in the shaft 55, which will by these means be supported so as to be rotated with but little friction.

59 are lock-nuts for the bolts 58.

If desired, the passages 54 54 can be supplied with a sleeve of antifriction metal, which will take up the wear of the shaft 55, the bolts 58 tending to prevent lateral movement of the shaft 55. Ordinarily, however, since the movements of the shaft 55 are comparatively slight, the cone-bearings formed by the bearing 58 58 will be sufficient to serve both purposes.

60 is a hollow metallic drum, of the proper diameter, keyed or otherwise secured to the shaft 55 and which forms the support for the switch at the bow which corresponds to the switch 2. (Shown in Fig. 1.)

61 is a strip of insulating material, which is placed on the front of the drum 60. 62 are contact-plates, which are secured to said insulating-strip 61.

In practice we prefer to form slots 63 in the face of the drum 60, as shown in Fig. 5, and to provide each contact-piece 62 with two bolts 64, which pass through said slots 63, being insulated from the metal of the drum 60, if necessary.

65 is a disk of insulating material, which is placed within the drum 60, as shown. The bolts 64 of the contact-pieces 62 pass through this insulating-plate 65 and are provided with nuts 66 thereon, by means of which the contact-pieces 62 can be held firmly in place.

Connecting the contact-pieces 62 62 on each side of the neutral plate 67, which corresponds to the dead-points 34 34, of Fig. 1, are resistances 68, which are made of any desired material, but preferably of wire of high resistance, and arranged in any suitable way. Resistance-strips of carbon or "enamel," so-called, may also be used with good results.

69 is the back of the drum 60, which is provided with slots 70 therein, so as to ventilate the interior of the drum and carry off the heat from the resistances 68.

71 is an insulating-collar mounted on the shaft 55, and 72 73 are contact-rings secured to said insulating-collar. These contact-rings 72 73 connect each with one of the series of contact-pieces 62, as will be understood, by means of the insulated conductors 74, which pass through the slots 70 in the back of the drum 60.

75 is a beveled wheel secured to the lower end of the shaft 43, and 76 is a larger beveled wheel engaging therewith and formed integral with the sleeve 77, which rotates upon the shaft 55. The said sleeve is provided with the arms 78 78, which travel adjacent to the contact-pieces 62 and in the same plane therewith. At the end of each arm 78 is a metallic brush-holder 79, insulated from the arms 78 by an insulating-sleeve 80, and each being held in place by the nuts 81 engaging the screw-threaded end of said brush-holder. Within each brush-holder is a brush 82, made preferably of carbon, as heretofore.

83 is an adjusting-screw engaging within the upper end of each brush-holder 79, and 84 is a small spiral spring arranged between said adjusting-screw and each of the brushes 82.

When the parts are at rest, the brushes 82 are in contact with the neutral plates 67, but are adapted to engage with the contact-pieces 62 on either side of said neutral plate.

84 is an insulating-coil and carrying contact-rings 85 and 86. These contact-rings connect with the brush-holders 79 by insulated conducting-strips 87, as shown.

88 88 are supporting-brackets, which are mounted either beneath the collecting-rings 72 73 85 86 or at one side thereof, and which carry brush-holders 89, corresponding to the brush-holder 79. The brush-holders 89 carry brushes 90, which engage with said collecting-rings.

91 is a worm-wheel rigidly keyed to the shaft 55 between the insulating-wheel 71 and the standard 49, as shown, and engaging with said worm-wheel is a worm 92, which worm is mounted on the shaft 93 of an electric motor 94 of any desirable type. The said worm 92 is supported by brackets 95 95. (See Figs. 2 and 4.) The motor 94, just referred to, corresponds to the motor 8 of Fig. 1.

By mounting elements at the bow within the hold of the vessel beneath the chart-house or pilot-house, and by operating said elements by the vertical shaft 43, the motor 94 or other parts will not affect the compass materially, and said elements being beneath the deck, in the case of a man-of-war, will be effectively protected from the effects of shot.

Referring to Figs. 6, 7, 8, and 9, the construction of the elements at the stern of the vessel will be readily understood.

96 is a heavy base mounted on one of the intermediate decks of the vessel. Extending up from this base is a heavy hollow supporting-bracket 97, which carries the cylinders 98 of the engine. In practice, the cylinders 98 98 are arranged at an angle to each other in order to overcome dead-centers. The cylinders 98 are provided each with a valve-chest 99, having a valve therein operating from the eccentrics 100.

101 is a vertical valve-chest having a sliding throttle-valve 102 therein, adapted to uncover the ports 103 or 104, according to the direction in which it is desired to have the engine run.

105 is a heavy standard extending up from the base 96 at the other side of the engine.

106 is a main driving-shaft, which is mounted in the standards 97 and 105, as shown. The shaft 106 is provided with a crank 107, which is operated by the pistons in the cylinders 98.

108 is a pinion mounted on the shaft 106, engaging with a gear-wheel 109, which gear-wheel is mounted on the shaft 110, supported in bearings 111 112 on the standards 97 and 105, respectively. The shaft 110 extends adjacent to the rudder-stock and operates the rudder, as will be presently explained.

113 is a bearing supported by the arch 114.

115 is a vertical shaft mounted at its lower end in the bearing 113 and at its upper end in the bearing 116.

117 is a beveled gear secured to the shaft 110 between the bearings 112 and 114, and 118 is a small beveled gear engaging with the gear 117. The beveled gear 118 is made integral with the collar 119, which carries a lazy-screw 120 at its upper end, said screw being carried in a bearing 121, secured to the standard 105. The shaft 115 is free to revolve within the collar 119 and lazy-screw 120.

122 is a sleeve keyed to the shaft 115, but capable of moving vertically up and down thereon and carrying a sleeve 123, screw-threaded on its interior and engaging with the lazy-screw 120.

124 is a collar at the upper end of the sleeve 122, and engaging with this collar at one or both sides is an angle-lever 125, mounted within the standard 105. The vertical arm of this angle-lever connects by means of a rod 126 with the vertical arm of the corresponding angle-lever 127 at the other side of the engine, mounted in a continuation 128 of the standard 97. The horizontal arm of the angle-lever 127 connects by means of the rod 129 with the sliding throttle-valve 102.

The parts just explained are clearly illustrated in Fig. 7, to which reference is now directed. At the top of the engine is a platform 130, supported by the standards 128 and 105, and this platform carries the reversing-switch, which corresponds to the switch 13 of Fig. 1, which is clearly illustrated in Fig. 7.

131 132 are standards carrying bearings 133 and 134. Mounted within these bearings 133 134 is a shaft 135.

136 is a drum keyed to the shaft 135, provided with contact-pieces and resistances like the drum 60 and which need not, therefore, be described in detail.

137 is a sprocket-wheel mounted on the shaft 135, and which is provided with arms 139, carrying brushes 140, arranged as in Figs. 3 and 4.

141 is a smaller sprocket-wheel mounted on the shaft 106 of the engine and connecting the sprocket-wheels 141 and 137 with a sprocket-chain 142, as shown in Fig. 6.

143 is a beveled wheel keyed to the end of the shaft 135 and engaging with the small beveled wheel 144 at the end of the shaft 115.

145 is a worm-wheel mounted on said shaft 115 directly beneath the bearings 116.

146 is a platform secured to the standard 105 and carrying an electric motor 147 of any approved construction.

148 is a worm engaging with the worm-wheel 145 and which is mounted on a shaft of the motor 147. The motor 147 corresponds to the motor 16 of Fig. 1.

Referring to Figs. 8 and 9, the mechanism for actuating the rudder by means of the engine described will be understood.

149 is a rudder-stock, to which a heavy segment 150 is rigidly keyed, the shaft 110 extending out from the engine adjacent to the teeth of this segment, and said shaft being supported between suitable bearings throughout its length.

151 is a heavy worm which is keyed to the shaft 110 by means of keys 152, three of said keys being shown in Fig. 9, so that the worm 151 is free to move laterally on said shaft.

153 153 are heavy pillow-blocks secured to the deck of the vessel, the heads of which surround the shaft 110.

154 154 are heavy spiral springs mounted between the worm 151 and the pillow-blocks 153 153, said springs being normally in tension. By making use of this construction it will be seen that when the shaft 110 is rotated, carrying the worm with it, the segment 150 will be moved in one direction or another, and by making use of the spring 154 and having the worm capable of being moved on the shaft 110 the thrust of the rudder, under the action of the seas, will be taken up by the pillow-boxes 153 153, so that the steering-engine will not be unnecessarily strained.

The parts just described being set up, we prefer to supply current thereto from any convenient circuit on the boat, although it will be understood that a small isolated plant may be made use of for the purpose. At the bow either set of brushes 80 can be connected with the mains, the other set being connected to the motor 147. At the stern either of the corresponding set of brushes can be connected with the mains and the other brushes are connected with the motor 94.

The parts being properly assembled, we operate as follows: One of the steering-wheels 47 is operated, as heretofore, so as to revolve the shaft 43, and this movement of the shaft through the gears 75 and 76 will carry the brushes 82 over the contact-pieces 62, and current will be supplied to the motor 147 at the stern, which will be caused to rotate in the proper direction. This motor 147 will actuate the worm 148, which, being in engagement with the worm-wheel 145, will turn the latter, carrying the shaft 115 with it. The lazy-screw 120, being stationary, the sleeve 123, carried by the shaft 115, will be elevated or depressed on the lazy-screw according to the direction of the movement of the motor, and the angle-lever 125 will be actuated, causing the valve 102 to be moved through the instrumentalities of the rods 126 and 129 and the angle-lever 127. This movement of the valve 102 will open either the port 103 or 104, whichever is necessary to secure the proper movements of the engine, and steam will be admitted to the cylinders 98 98. The same movement of the shaft 115 which causes the sleeve 123 to be elevated to start the engine will revolve the shaft 135 through the gears 143 144. The switch which is mounted on this shaft 135 will be therefore moved with respect to the brushes 140, and current will be supplied to the motor 94 at the bow. This motor 94 will revolve in the proper direction, and the worm 92, engaging with the worm-wheel 91, will revolve the shaft 55, carrying the switch 60 with it. This switch 60 will therefore tend to revolve in the same direction that the brushes 82 are moving, as explained in connection with Fig. 1. The movements of the engine are communicated through the sprocket-wheels 141 and 147 and sprocket-chain 142 to the brushes 140, which will be moved in the same direction as the switch 136. The shaft 106 in rotating will actuate the gear-wheel 109 and shaft 110, which latter controls the rudder, as before explained. The shaft 110 in operating carries the gear-wheel 117 with it, and the latter gear-wheel engages with the gear 118 and tends to revolve the lazy-screw 120 in an opposite direction from the sleeve 123; but so long as the motor 147 is operating the sleeve 123 will be sufficiently elevated with respect to said lazy-screw as to admit steam for driving the engine. The parts thus operated, it will be observed that at the bow the brushes 62 are moving in advance of the switch 60, that at the stern the switch 136 is moving in advance of the brushes 140, and that with regard to the engine the sleeve 123 is being constantly elevated while the lazy-screw 120 is being constantly depressed.

The steering-wheel 47 is rotated to any extent for the proper steering of the vessel and with any speed and in any direction, and for the reasons before explained the steering-engine at the stern will partake of a corresponding direction and extent of movement and at a corresponding speed. When the movements of the steering-wheel 47 are arrested, the movements of the engine will be arrested, as before explained.

The general idea above explained of so operating the valves of steam steering-engines that the tendency of the engine in operating will be to close the valve, whereby when the movement of the steering-wheel is arrested the engine will close said valve is common in many types of steering-gears and may be accomplished by a variety of devices now used for that purpose. The connections between the operating device (in the present case the main electric motor) and the engine-valve by which the engine will be so controlled we will hereinafter refer to generically as "differential connections."

The word "constantly" when used in our claims has reference to the action of the parts—such as the making or breaking of the electric circuits or the opening or closing of the engine-valve—only during the operation of the device. It is understood, of course, that all circuits are broken and that the engine-valve is closed when the various elements are at rest.

Having now described our invention, what we claim as new therein, and desire to secure by Letters Patent, is as follows:

1. The method of controlling electric motors, which consists in constantly completing an electric circuit in which the motor to be controlled is placed, and by means of the controlled motor in constantly completing a circuit in which is placed a second motor which tends to constantly break the circuit of the controlled motor, substantially as and for the purpose described.

2. The method of controlling electric motors, which consists in constantly completing by hand an electric circuit in which the motor to be controlled is placed, and by means of the controlled motor in constantly completing a circuit in which is placed a second motor which tends to constantly break the circuit of the controlled motor, substantially as and for the purpose described.

3. The method of controlling electric motors, which consists in constantly completing a circuit in which the motor to be controlled is placed, in constantly completing by means of said controlled motor, a circuit in which is placed a second motor, said second motor constantly tending to break the circuit of the controlled motor, and in operating a prime motor by the controlled motor, which prime motor tends to constantly break the circuit of the second motor, substantially as and for the purposes set forth.

4. The method of controlling electric motors, which consists in constantly completing by hand a circuit in which the motor to be controlled is placed, in constantly completing by means of said controlled motor, a circuit in which is placed a second motor, said second motor constantly tending to break the circuit of the controlled motor, and in operating a prime motor by the controlled motor, which prime motor tends to constantly break the circuit of the second motor, substantially as and for the purposes set forth.

5. In means for controlling electric motors, the combination of a main electric motor, a circuit or circuits therefor, a switch in said circuit or circuits, means for constantly keeping said switch closed, and a second electric motor controlled by the main electric motor, said second electric motor tending to constantly open the switch in the circuit or circuits of the main electric motor, substantially as set forth.

6. In means for controlling electric motors, the combination of a main electric motor, a circuit or circuits therefor, a switch in said circuit or circuits, means for constantly keeping said switch closed, a second electric motor connected with and tending to constantly open said switch, a circuit or circuits for the second electric motor, a switch in said last mentioned circuit or circuits and connections between said last mentioned switch and said main electric motor for constantly closing said switch, substantially as set forth.

7. In means for controlling electric motors, the combination of a main electric motor, a circuit or circuits therefor, a switch in said circuit or circuits, means operated by hand for constantly keeping said switch closed, and a second electric motor controlled by the main electric motor, said second electric motor tending to constantly open the switch in the circuit or circuits of the main electric motor, substantially as set forth.

8. In means for controlling electric motors, the combination of a main electric motor, a circuit or circuits therefor, a switch in said circuit or circuits, means operated by hand for constantly keeping said switch closed, a second electric motor connected with and tending to constantly open said switch, a circuit or circuits for the second electric motor, a switch in said last mentioned circuit or circuits and connections between said last mentioned switch and said main electric motor for constantly closing said switch, substantially as set forth.

9. In means for controlling electric motors, the combination of a main electric motor, a circuit or circuits therefor, a switch in said circuit or circuits, means for constantly keeping said switch closed, a second electric motor and a prime motor controlled by the main electric motor, said main electric motor and prime motor jointly controlling the second electric motor and said second electric motor tending to constantly open the switch in the circuit or circuits of the main electric motor, substantially as set forth.

10. In means for controlling electric motors, the combination of a main electric motor, a circuit or circuits therefor, a switch in said circuit or circuits, means operated by hand for constantly keeping said switch closed, a second electric motor and a prime motor controlled by the main electric motor, said main electric motor and prime motor jointly controlling the second electric motor and said second electric motor tending to constantly open the switch in the circuit or circuits of the main electric motor, substantially as set forth.

11. In means for controlling electric motors, the combination of a main electric motor, a circuit or circuits therefor, a switch in said circuit or circuits, means for constantly keeping said switch closed, a second electric motor connected with and tending to constantly open said switch, a circuit or circuits for the second electric motor, a switch in said circuit or circuits, a prime motor controlled by the main electric motor, connections between said main electric motor and said last mentioned switch for constantly closing the same, and connections between said prime motor and said switch tending to constantly open the same, substantially as set forth.

12. In means for controlling electric motors, the combination of a main electric motor, a circuit or circuits therefor, a switch in said circuit or circuits, means operated by hand for constantly keeping said switch closed, a second electric motor connected with and tending to constantly open said switch, a circuit or circuits for the second electric motor, a switch in said circuit or circuits, a prime motor controlled by the main electric motor, connections between said main electric motor and said last mentioned switch for constantly closing the same, and connections between said prime motor and said switch tending to constantly open the same, substantially as set forth.

13. In means for controlling steam engines or other prime motors, the combination of an engine, valves for controlling the same, a main electric motor connected with and operating said valves, a circuit or circuits for the main electric motor, a switch in said circuit or circuits, means for constantly keeping said switch closed, a second electric motor connected with and tending to constantly open said switch, a circuit or circuits for the second electric motor, a switch in said circuit or circuits, connections between said main electric motor and said last mentioned switch for constantly closing the same, and connections between said engine and said switch tending to constantly open the same, substantially as set forth.

14. In means for controlling steam engines or other prime motors, the combination of an engine, valves for controlling the same, a main electric motor connected with and operating said valves, a circuit or circuits for the main electric motor, a switch in said circuit or circuits, means operated by hand for constantly keeping said switch closed, a second electric motor connected with and tending to constantly open said switch, a circuit or circuits for the second electric motor, a switch in said circuit or circuits, connections between said main electric motor and said last mentioned switch for constantly closing the same, and connections between said engine and said switch tending to constantly open the same, substantially as set forth.

15. In means for controlling electric motors, the combination of a main electric motor, a circuit or circuits therefor, a combined reversing switch and rheostat in said circuit or circuits, means for constantly keeping said switch closed, and a second electric motor controlled by the main electric motor and tending to constantly open said switch, substantially as set forth.

16. In means for controlling electric motors, the combination of a main electric motor, a circuit or circuits therefor, a combined reversing switch and rheostat in said circuit or circuits, means operated by hand for constantly keeping said switch closed, and a second electric motor controlled by the main electric motor and tending to constantly open said switch, substantially as set forth.

17. In means for controlling electric motors, the combination of a main electric motor, a circuit or circuits therefor, a combined reversing switch and rheostat in said circuit or circuits, means for constantly keeping said switch closed, a second electric motor connected with and tending to constantly open said switch, a circuit or circuits for the second electric motor, a combined reversing switch and rheostat in said circuit or circuits, and connections between said last mentioned switch and said main electric motor for constantly closing said switch, substantially as set forth.

18. In means for controlling electric motors, the combination of a main electric motor, a circuit or circuits therefor, a combined reversing switch and rheostat in said circuit or circuits, means operated by hand for constantly keeping said switch closed, a second electric motor connected with and tending to constantly open said switch, a circuit or circuits for the second electric motor, a combined reversing switch and rheostat in said circuit or circuits, and connections between said last mentioned switch and said main electric motor for constantly closing said switch, substantially as set forth.

19. In means for controlling electric motors, the combination of a main electric motor, a circuit or circuits therefor, a combined reversing switch and rheostat in said circuit or circuits, means for constantly keeping said switch closed, a second electric motor, and a prime motor controlled by the main electric motor, said main electric motor and prime motor jointly controlling the second electric motor, and said second electric motor tending to constantly open the switch in the circuit or circuits of the main electric motor, substantially as set forth.

20. In means for controlling electric motors, the combination of a main electric motor, a circuit or circuits therefor, a combined reversing switch and rheostat in said circuit or circuits, means operated by hand for constantly keeping said switch closed, a second electric motor, and a prime motor controlled by the main electric motor, said main electric motor and prime motor jointly controlling the second electric motor, and said second electric motor tending to constantly open the switch in the circuit or circuits of the main electric motor, substantially as set forth.

21. In means for controlling electric motors, the combination of a main electric motor, a circuit or circuits therefor, a combined reversing switch and rheostat in said circuit or circuits, means for constantly keeping said switch closed, a second electric motor connected with and tending to constantly open said switch, a circuit or circuits for the second electric motor, a combined reversing switch and rheostat in said circuit or circuits, a prime motor controlled by the main electric motor, connections between said main electric motor and said last mentioned switch for constantly closing the same, and connections between said prime motor and switch tending to constantly open the same, substantially as set forth.

22. In means for controlling electric motors, the combination of a main electric motor, a circuit or circuits therefor, a combined reversing switch and rheostat in said circuit or circuits, means operated by hand for constantly keeping said switch closed, a second electric motor connected with and tending to constantly open said switch, a circuit or circuits for the second electric motor, a combined reversing switch and rheostat in said circuit or circuits, a prime motor controlled by the main electric motor, connections between said main electric motor and said last mentioned switch for constantly closing the same, and connections between said prime motor and switch tending to constantly open the same, substantially as set forth.

23. In means for controlling steam engines or other prime motors, the combination of an engine, valves for controlling the same, a main electric motor connected with and operating said valves, a circuit or circuits for the main electric motor, a combined reverse-switch and rheostat on said circuit or circuits, means for constantly keeping said switch closed, a second electric motor connected with and tending to constantly open said switch, a circuit or circuits for the second electric motor, a combined reversing switch and rheostat in said circuit or circuits, connections between said main electric motor and said last mentioned switch for constantly closing the same, and connections between said engine and said switch tending to constantly open the same, substantially as set forth.

24. In means for controlling steam engines or other prime motors, the combination of an engine, valves for controlling the same, a main electric motor connected with and operating said valves, a circuit or circuits for the main electric motor, a combined reversing switch and rheostat in said circuit or circuits, means operated by hand for constantly keeping said switch closed, second electric motor connected with and tending to constantly open said switch, a circuit or circuits for the second electric motor, a combined reversing switch and rheostat in said circuit or circuits, connections between said main electric motor and said last mentioned switch for constantly closing the same and connections between said engine and said switch tending to constantly open the same, substantially as set forth.

25. In means for controlling electric motors, the combination of a main electric motor, a circuit or circuits therefor, a revolving switch having movable contact arms in the circuit or circuits of the main electric motor, means for moving said contact arms a revolving switch having movable contact arms adjacent to the main electric motor, said switch being connected to and operated by the main electric motor, a circuit or circuits from the contact arms of said switch to a second electric motor adjacent to the first switch and mechanical connections between said second electric motor and said first switch, substantially as set forth.

26. In means for controlling electric motors, the combination of a main electric motor, a circuit or circuits therefor, a revolving switch having movable contact arms in the circuit or circuits of the main electric motor, means operated by hand for moving said contact arms, a revolving switch having movable contact arms adjacent to the main electric motor, said switch being connected to and operated by the main electric motor, a circuit or circuits from the contact arms of said switch to a second electric motor adjacent to the first switch and mechanical connections between said second electric motor and said first switch, substantially as set forth.

27. In means for controlling electric motors, the combination of a main electric motor, a circuit or circuits therefor, a revolving switch having movable contact arms in the circuit or circuits of the main electric motor, resistances in said switch, means for moving said contact arms, a revolving switch having movable contact arms adjacent to the main electric motor, resistances in said switch, said switch being connected to and operated by the main electric motor, a circuit or circuits from the contact arms of said switch to a second electric motor adjacent to the first switch and mechanical connections between said second electric motor and said first switch, substantially as set forth.

28. In means for controlling electric motors, the combination of a main electric motor, a circuit or circuits therefor, a revolving switch having movable contact arms in the circuit or circuits of the main electric motor, resistances in said switch, means operated by hand for moving said contact arms, a revolving switch having movable contact arms adjacent to the main electric motor, resistances in said switch, said switch being connected to and operated by the main electric motor, a circuit or circuits from the contact arms of said switch to a second electric motor adjacent to the first switch, and mechanical connections between said second electric motor and said first switch, substantially as set forth.

29. The combination of a main electric motor, a circuit or circuits therefor, a revolving switch having movable contact arms in the circuit or circuits of the main electric motor, means for moving said contact arms, a revolving switch having movable contact arms adjacent to the main electric motor, said switch being connected to and operated by the main electric motor, a circuit or circuits from the contact arms of said switch through a second electric motor adjacent to the first switch, mechanical connections between said electric motor and said first switch, a prime motor controlled by said main electric motor, and connections between said prime motor and the contact arms of said second switch, substantially as set forth.

30. The combination of a main electric motor, a circuit or circuits therefor, a revolving switch having movable contact arms in the circuit or circuits of the main electric motor, means operated by hand for moving said contact arms, a revolving switch having movable contact arms adjacent to the main electric motor, said switch being connected to and operated by the main electric motor, a circuit or circuits from the contact arms of said switch through a second electric motor adjacent to the first switch, mechanical connections between said second electric motor and said first switch, a prime motor controlled by said main electric motor and connections between said prime motor and the contact arms of said second switch, substantially as set forth.

31. In means for controlling steam engines or other prime motors, the combination of an engine, valves for controlling the same, a main electric motor connected with and operating said valves, a circuit or circuits for the main electric motor, a revolving switch having movable contact arms in the circuit or circuits of the main electric motor, means for moving said contact arms, a revolving switch having movable contact arms adjacent to the main electric motor, said switch being connected to and operated by the main electric motor, a circuit or circuits from the contact arms of said switch and a second electric motor adjacent to the first switch, mechanical connections between said second electric motor and said first switch, and mechanical connections between said engine and the contact arms of said second switch, substantially as set forth.

32. In means for controlling steam engines or other prime motors, the combination of an engine, valves for controlling the same, a main electric motor connected with and operating said valves, a circuit or circuits for the main electric motor, a revolving switch having movable contact arms in the circuit or circuits of the main electric motor, means operated by hand for moving said contact arms, a revolving switch having movable contact arms adjacent to the main electric motor, said switch being connected to and operated by the main electric motor, a circuit or circuits from the contact arms of said switch and a second electric motor adjacent to the first switch, mechanical connections between said second electric motor and said first switch, and mechanical connections between said engine and the contact arms of said second switch, substantially as set forth.

33. In an electric steering gear, the combination with a steering engine and a main electric motor for controlling the same, of a switch at the bow of the vessel for controlling said main electric motor, means for operating said switch, whereby the circuit of the main electric motor will be constantly closed, and a second electric motor connected with said switch tending to constantly break said circuit, substantially as described.

34. In an electric steering gear, the combination with a steering engine and a main electric motor for controlling the same, of a switch at the bow of the vessel for controlling said main electric motor, means operated by hand for operating said switch, whereby the circuit of the main electric motor will be constantly closed, and a second electric motor connected with said switch tending to constantly break said circuit, substantially as described.

35. In an electric steering gear, the combination with a steering engine and a main electric motor for controlling the same, of a switch at the bow of the vessel for controlling said motor, means for operating said switch whereby the circuit of the said main electric motor will be constantly closed, and a second electric motor connected with the switch tending to constantly break said circuit, said second electric motor being controlled by the main electric motor, substantially as described.

36. In an electric steering gear, the combination with a steering engine and a main electric motor for controlling the same, of a switch at the bow of the vessel for controlling said motor, means operated by hand for operating said switch whereby the circuit of the said main electric motor will be constantly closed, and a second electric motor connected with the switch tending to constantly break said circuit, said second electric current being controlled by the main electric motor, substantially as described.

37. In an electric steering gear, the combination with a steering engine and an electric motor for controlling the same, of a switch at the bow of the vessel for controlling said motor, means for operating said switch whereby the circuit to said motor will be constantly closed and means controlled by said main electric motor tending to constantly break said circuit, substantially as set forth.

38. In an electric steering gear, the combination of a steering engine, and an electric motor for controlling the same, of a switch at the bow of the vessel, for controlling said motor, comprising a shaft 55, a switch 60 mounted thereon, brushes 82, 82, in contact with said switch, means for operating said brushes independent of said switch and an electric motor 94 for operating said switch independent of the movements of said brushes, substantially as described.

39. In an electric steering gear, the combination of a steering engine, and an electric motor for controlling the same, of a switch at the bow of the vessel, for controlling said motor, comprising a shaft 55, a switch 60 mounted thereon, brushes 82, 82 in contact with said switch, means actuated by hand for operating said brushes independent of said switch and an electric motor 94 for operating said switch independent of the movements of said brushes, substantially as described.

40. In an electric steering gear, the combination with a steering engine and a main electric motor for controlling the same, of a switch at the bow of the vessel for controlling said motor, comprising the shaft 55, switch 60 mounted thereon, brushes 82, 82, in contact with said switch, means for operating said brushes independent of said switch, and an electric motor 94 for operating said switch independent of the movements of said brushes, said electric motor 94 being controlled by the main electric motor, substantially as described.

41. In an electric steering gear, the combination with a steering engine and a main electric motor, of a switch at the bow of the vessel for controlling said motor comprising a shaft 55, a switch 60 mounted thereon, resistances 68 within said switch, brushes 82, in contact with said switch, means for operating said brushes independent of the movements of said switch and an electric motor 94 for operating the switch independent of the movements of said brushes, said motor 94 being controlled by the main electric motor, substantially as described.

42. In an electric steering gear, the combination with a steering engine and an electric motor for controlling the same, of a switch at the bow of the vessel for controlling said motor, comprising a shaft 55, a switch 60 keyed on said shaft, a sleeve 77 mounted loosely on said shaft, brushes 82, 82 carried by said sleeve, and in contact with said switch, means for operating said sleeve independent of the movements of said switch, and means for operating said switch independent of the movements of said sleeve, substantially as described.

43. In an electric steering gear, the combination with a steering engine and an electric motor for controlling the same, of a switch at the bow of the vessel for controlling said motor, comprising a shaft 55, a switch 60 keyed on said shaft, a sleeve 77 mounted loosely on said shaft, brushes 82, 82 carried by said sleeve, and in contact with said switch, means actuated by hand for operating said sleeve independent of the movements of said switch and means for operating said switch independent of the movements of said sleeve, substantially as described.

44. In an electric steering gear, the combination with a steering engine and an electric motor for controlling the same, of a switch at the bow of the vessel for controlling the motor, comprising a shaft 55, a switch 60 keyed to said shaft, a sleeve 77 mounted on said shaft, brushes 82, carried by said sleeve and in contact with said switch, a vertical shaft 43 for operating said sleeve independent of the movements of the switch and means for operating said switch independent of the movements of said sleeve, substantially as described.

45. In an electric steering gear, the combination with a steering engine and an electric motor for controlling the same, of a switch at the bow of the vessel for controlling the motor, comprising the shaft 55, a switch 60 keyed to said shaft, a sleeve 77 mounted on said shaft, brushes 82, 82 carried by said sleeve and in contact with said switch, a vertical shaft 43 for operating said sleeve independent of the movements of the switch, and means controlled by the said electric motor for operating said switch independent of the movements of said sleeve, substantially as described.

46. In an electric steering gear, the combination with a steering engine and an electric motor for controlling the same, of mechanism at the bow of the vessel for controlling said motor, comprising the shaft 55, a switch 60 keyed to said shaft, a sleeve 77 mounted on said shaft, and carrying brushes 82, 82 in contact with said switch, a gear wheel 76 carried by said sleeve, a gear wheel 75 in engagement with the gear wheel 76, a vertical shaft 43 for operating the gear wheel 75, whereby the brushes 82 may be moved independent of the movements of said switch and means, by which the switch may be moved independently of the movements of said brushes, substantially as described.

47. In an electric steering gear, the combination with a steering engine and an electric motor for controlling the same, of mechanism at the bow of the vessel for controlling said motor, comprising a shaft 55, a switch 60 keyed to said shaft, a sleeve 77 mounted on said shaft and carrying brushes 82, 82 in contact with said switch, a gear wheel 76 carried by said sleeve, a gear wheel 75 in engagement with the gear wheel 76, a vertical shaft 43 for operating the gear wheel 75 whereby the brushes 82 may be moved independent of the movements of said switch, and means controlled by said electric motor by which the switch may be moved independent of the movements of said brushes, substantially as described.

48. In an electric steering gear, the combination with a steering engine and an electric motor for controlling the same, of mechanism at the bow of the vessel for controlling said motor, comprising a shaft 55, a switch 60 keyed thereon, a sleeve 77 mounted on said shaft and carrying brushes 82, 82 in contact with said switch, a vertical shaft 43, connections between said shaft and said sleeve whereby said brushes may be moved independent of the movements of said switch and a steering wheel connected with said shaft 43 for operating the same, substantially as described.

49. In an electric steering gear, the combination with a steering engine and an electric motor for controlling the same, of mechanism at the bow of the vessel for controlling said motor, comprising the standards 49, 50, shaft 55 carried by said standards, a switch 60 keyed to said shaft brushes 82, 82 in contact with said switch means for operating said brushes independent of the switch, and means for operating said switch independent of the said brushes, substantially as described.

50. In an electric steering gear, the combination with the steering engine and an electric motor for controlling the same, of mechanism at the bow of the vessel for controlling said motor, comprising the standards 49, 50, shaft 55, carried by said standards, a switch 60 keyed to said shaft, brushes 82, 82 in contact with said switch, means actuated by hand for operating said brushes independent of the switch, and means for operating said switch independent of the said brushes, substantially as described.

51. In an electric steering gear, the combination with a steering engine and an electric motor for controlling the same, of mechanism at the bow of the vessel for controlling said motor, comprising the standards 49, 50, shaft 55, carried by said standards, a switch 60 keyed to said shaft, brushes 82, 82 in contact with said switch, means for operating said brushes independent of the same, and means controlled by said electric motor for operating the said switch independent of the said brushes, substantially as described.

52. In an electric steering gear, the combination with a main electric motor for controlling the same, of mechanism at the bow of the vessel for controlling said motor, comprising the standards 49, 50, shaft 55 mounted on said standards, switch 60 keyed to said shaft, brushes 82 82 in contact with said switch, means for operating the brushes independent of said switch, worm wheel 91 keyed to said shaft and electric motor 94 carrying a worm 92 in engagement with said worm wheel 91 whereby the switch 60 may be moved independent of said brushes, substantially as described.

53. In an electric steering gear, the combination with a main electric motor for controlling the same, of mechanism at the bow of the vessel for controlling said motor, comprising the standards 49, 50, shaft 55 mounted on said standards, switch 60 keyed to said shaft, brushes 82 82 in contact with said switch, worm wheel 91 keyed to said shaft and electric motor 94 controlled by said main electric motor carrying a worm 92 in engagement with said worm wheel 91 whereby the switch 60 may be moved independent of said brushes, substantially as described.

54. In an electric steering gear, the combination with a steering engine and an electric motor for controlling the same, of mechanism at the bow of the vessel for controlling said motor, comprising standards 49, 50, shaft 55 carried by said standards, brackets 56 on said standards, set screw 58 engaging the ends of said shaft 55, switch 60 keyed to said shaft, brushes 82 82 in contact with said switch, mechanism for operating said brushes independent of said switch and mechanism for operating said switch independent of the brushes, substantially as described.

55. In an electric steering gear, the combination with a steering engine and an electric motor for controlling the same, of mechanism at the bow of the vessel for controlling said motor, comprising standards 49, 50, shaft carried by said standards, switch 60 keyed to said shaft, contact rings 72 73 carried by said shaft and connected to the two sides of said switch, brushes 89 89, in contact with said rings 72 73, sleeve 77 mounted on said shaft, brushes 82 carried by said sleeve and in contact with said switch, contact rings 85 86, carried by said sleeve, brushes 89 89 in contact with said rings 85 86, means for operating said brushes independent of the movements of said switch and means for operating said switch independent of said brushes, substantially as described.

56. In an electric steering gear, the combination with a steering engine, of a valve for controlling the same, an electric motor which in operating tends to constantly open said valve, and differential connections between said steering engine and said valve which tend to constantly close the valve when the engine is operating, substantially as described.

57. In an electric steering gear, the combination with a steering engine, of a valve for controlling the same, an electric motor controlled by hand which in operating tends to constantly open said valve, and differential connections between said engine and said valve tending to constantly close the same when the engine is operating, substantially as described.

58. In an electric steering gear, the combination of a steering engine, a valve for controlling the same, an electric motor mounted upon and adjacent to said engine, connections between said electric motor and said valve, whereby when the electric motor is operating the valve will be kept constantly open, differential connections between said engine and said valve which tend to constantly close the valve when the engine is operating, a switch at the bow of the vessel, and connections between said switch and said electric motor for controlling the said electric motor, substantially as described.

59. In an electric steering gear, the combination of a steering engine, a valve for controlling the same, an electric motor mounted upon and adjacent to said steering engine, connections between said electric motor and said valve, whereby when the electric motor is operating the said valve will be kept constantly open, differential connections between said steering engine and said valve tending to constantly close the valve when the engine is operating, a switch at the bow of the vessel operated by hand for controlling said electric motor, and connections between said switch and said electric motor, substantially as described.

60. In an electric steering gear, the combination of a steering engine, a valve for controlling the same, an electric motor mounted upon or adjacent to said steering engine; connections between said electric motor and said steering engine, whereby when said electric motor is operating the said valve will be kept constantly open, differential connections between said steering engine and said valve tending to constantly close the valve when the engine is operating; a revolving switch having independently moving contact arms at the bow of the vessel; a circuit or circuits from said switch to said electric motor; means for operating said contact arms, whereby said circuit or circuits will be constantly closed; a second electric motor in the last named circuit or circuits, connected with the switch at the bow of the vessel and tending to constantly break the circuit of the main electric motor; and, mechanical connections between the steering engine, and a switch thereon tending to constantly break the circuit of the second electric motor, substantially as described.

61. In an electric steering gear, the combination of a steering engine, a valve 102 for controlling the same, a sleeve 123, connections between said sleeve and said valve, a lazy screw 120 working in said sleeve, connections between said lazy screw and said steering engine, an electric motor 147 carried by said steering engine and connections between said electric motor and said sleeve 123, substantially as set forth.

FRANK L. DYER.
LEONARD H. DYER.

In presence of—
ARCHIE G. REESE,
SADIE STERN.